No. 894,663. PATENTED JULY 28, 1908.
E. KIMBER.
COMMERCIAL INSTRUMENT.
APPLICATION FILED JAN. 16, 1906.

2 SHEETS—SHEET 1.

Fig. 1.

| | NEW YORK EXCHANGE | TWENTY DOLLARS |
|---|---|---|
| ATTACH HERE FRACTIONAL CHECKS 10 CENTS OR OVER | THIS IS TO CERTIFY THAT THERE IS DEPOSITED IN THE RELIANCE TRUST CO. OF NEW YORK COLLATERAL SECURITIES HELD IN TRUST TO GUARANTEE PAYMENT OF THIS DRAFT *Reliance Trust Co of New York* | SER...... NO........ |
| ATTACH HERE FRACTIONAL CHECKS UNDER 10 CENTS | ——— NEW YORK EXCHANGE ACCOUNT ——— PAY TO THE ORDER OF THE INDORSER OR INDORSEE FOR VALUE RECEIVED ——— TWENTY DOLLARS ——— AND FRACTIONAL PART THEREOF AS SHOWN BY COUPON ATTACHMENT *Favorite Exchange System* TO THE RELIANCE TRUST CO OF NEW YORK OR ANY BANK HAVING THE ACCOUNT | |

Fig. 2.

SIGNATURE OF DEPOSITOR
*John Doe*

PAY TO *Richard Roe*
OR ORDER

*John Doe*
THIS MUST BE SIGNED BY DEPOSITOR

Witnesses
Geo. A. Bignell
Samuel Turley

Inventor
Emmor Kimber,
By Wilkinson & Fisher,
Attorneys.

No. 894,663.
PATENTED JULY 28, 1908.

E. KIMBER.
COMMERCIAL INSTRUMENT.
APPLICATION FILED JAN. 16, 1906

2 SHEETS—SHEET 2.

Fig. 3.

| 1<br>1¢<br>Ser. No. | 10<br>10¢<br>Ser. No. | 5<br>5¢<br>Ser. No. |
|---|---|---|
| 50<br>50¢<br>Ser. No. | 25<br>25¢<br>Ser. No. | 50<br>50¢<br>Ser. No. |
| 100<br>1.00<br>Ser. No. | 100<br>1.00<br>Ser. No. | 100<br>1.00<br>Ser. No. |

Witnesses
Geo. A. Pepue
Samuel Turley

Inventor
Emmor Kimber
By Wilkinson & Fisher
Attorneys

UNITED STATES PATENT OFFICE.

EMMOR KIMBER, OF DORCHESTER, MASSACHUSETTS.

COMMERCIAL INSTRUMENT.

No. 894,663.

Specification of Letters Patent.

Patented July 28, 1908.

Application filed January 16, 1906. Serial No. 296,414.

*To all whom it may concern:*

Be it known that I, EMMOR KIMBER, a citizen of the United States, residing at Dorchester, in the county of Suffolk and State of Massachusetts, have invented certain new and useful Improvements in Commercial Instruments; and I do hereby declare the following to be a full, clear, and exact description of the invention, such as will enable others skilled in the art to which it appertains to make and use the same.

This invention relates to commercial instruments and is primarily designed as a tangible medium to be used with a system of banking, wherein a depositor is enabled to draw to the extent of his deposit in different localities without the necessity of other means of identification than shown on the instrument.

In systems of this character it is essential that the depositor be protected against loss in the valuation of the instrument issued him in lieu of his deposit and this irrespective of the solidity of the bank wherein he has deposited.

For the purpose of more clearly understanding the application of the present invention with such a system the operation of a system of this character might be briefly referred to as follows:—Every bank constituting a link in the system before securing an issue of the commercial paper must deposit collateral securities with a central institution, which collateral securities are held in trust as a guaranteeing fund, the institution issuing a certificate to this effect with each instrument. The issuance of this guaranteed paper by the banks indicates also that there has been deposited in a bank the amount of that specific instrument and hence it becomes a certificate of deposit and in effect a portion of a negotiable instrument, if as in the present instance the instrument contains words of negotiability as a check or draft.

One of the principal objects of the invention therefore is to combine in one negotiable instrument a certificate of deposit of collateral securities guaranteeing the payment of a negotiable order thereon, the issuance of which acts as a certificate of deposit of cash to the depositor.

Another object of the invention is to provide means, whereby a fractional part of the normal face value of such an instrument may be incorporated and made a part of the full face value of the complete instrument guaranteed, as aforesaid, by collateral securities.

Another object is to provide ready means for checking up the paid instruments when returned to the exchange system or company.

While the invention is not restricted to the exact details as disclosed, still in the accompanying drawings there is illustrated a practical embodiment of the invention, the particular features of novelty of which are more succinctly stated in the claims.

Referring to the drawings:—Figure 1 represents a face view of the piece of commercial paper or instrument in its normal form of issuance. Fig. 2 represents a fragmentary view showing the back of the paper when signed up for negotiation. Fig. 3 represents a view, showing a plurality of coupons representing a fractional amount of the main instrument and when applied thereto forming a part of the instrument and representing a portion of the full face value thereof.

1 designates the main body portion of the improved piece of commercial paper or instrument, and 2 a marginal portion thereon adapted to receive one or more checks or coupons adapted to be secured thereon and when so secured forming a part of the instrument and representing a portion of the full face value thereof.

In the drawings the head of the instrument is shown as containing the words "New York Exchange Twenty Dollars", although this is not an essential part of the paper, and it will also be understood of course that the wording hereinafter referred to might be modified as to form. For the purpose of illustration, however, the upper portion of the main body portion 1 of the instrument contains a certificate 3 to the effect that there has been deposited in an institution collateral securities held in trust to guarantee payment of the instrument of which it forms a part. This certificate is signed by the institution, as indicated, and forms a part of the instrument.

Below the certificate there is arranged a negotiable order 4 drawn on the institution (illustrated in the drawings as the Reliance Trust Co. of New York) or any bank having the account, payable from the account secured by the collateral securities held in trust by the institution. This negotiable order is in the form of a check or draft for a specified amount, and a fractional part of that amount as shown by a coupon or coupons which when applied to the draft form a part thereof. The maker of this check is the company, (designated in the drawings as the "Favorite Exchange System") operating the system.

At the right upper end of the main body portion 1 of the instrument there appear blanks for the serial number of same.

On the marginal portion 2 of the instrument there may be printed the words "Attach here fractional checks 10 cents or over" and "Attach here fractional checks under 10 cents".

On the rear of the instrument is arranged a space 5 for the signature of the depositor when he first receives the paper, which space has the caption "Signature of depositor". Below this is arranged the negotiation phrase "Pay to the order of" with a blank space 6 to indicate the indorsee and a blank space 7 for the identifying signature of the depositor, with the words therebelow "This must be signed by depositor".

In Fig. 3 there is shown a plurality of coupons 8 designating a fractional part of any predetermined amount, which coupons may be serially numbered as at 8$^a$ and provided with watermarks 8$^b$, but this particular marking forms no part of the present invention. While these coupons are primarily adapted for use as small change and therefore are issued as fractional parts of a dollar, it will be understood that in carrying out the invention I do not limit myself to utilizing a fractional part of a dollar as the coupons might well be of a one dollar or two dollar denomination or in fact any fractional part of the main body of the instrument.

As shown in the drawings, referring to Fig. 1, the draft calls for "Twenty dollars and a fractional part thereof as shown by coupon attachment". This would limit the amount of the coupons to a sum less than twenty dollars, but it is obvious that so far as the invention is concerned, such limitation might be avoided by the particular reading of the draft issued by the exchange system.

It will be seen from the foregoing that when the banks forming a link of the system receive the commercial paper in the form of guaranteed instruments, they have to deposit collateral securities held in trust by the institution to guarantee the payment of the paper received by them. The banks in issuing this paper give it out to the depositor in the form of a plurality of main instruments and fractional coupons, the aggregate total of which is equal to the amount deposited with the bank. Upon the issuance of this paper by the bank to the depositor, he should sign his name on the back in the space indicated at 5 to prevent another from using the paper in case of loss, as if the blank space 5 is left unsigned, it could be filled in by another than the depositor.

If the depositor is in a foreign locality, upon presentation of the paper either with or without coupons attached, to any bank having the account, and signing in the space indicated at 7, his last signature will identify him as the depositor and the amount of the order paid, or if he wishes to negotiate the paper he may simply indorse it over, as indicated at 6, whereupon the instrument may be passed as an ordinary form of check.

The utility of this invention will be apparent to one acquainted with banking problems, but its many advantages for use in banking systems will not be further referred to, forming no part of the description of the invention proper.

What I claim is:—

1. A commercial instrument having a normal face value and containing matter rendering it negotiable, in combination with an element having a specific value indicated on its face and having means for attaching it to said instrument, said instrument containing matter whereby said element, when attached thereto, increases the normal face value of said instrument, substantially as described.

2. A commercial instrument comprising an order for the payment of money, containing matter rendering it negotiable, and also a certificate of deposit of collateral securities with a central institution to guarantee the payment of said order, in combination with a separate element having a specific value indicated on its face, and having means for attaching it to said instrument, said instrument containing matter whereby said element, when attached to said instrument, increases the normal face value thereof, substantially as described.

3. A commercial instrument comprising an order for the payment of money containing matter rendering it negotiable, and a certificate of deposit of collateral securities with a central institution to guarantee the payment of said order, in combination with a separate element having a specific value indicated on its face and having means for attaching it to said instrument, said instrument containing matter whereby said element, when attached thereto, increases the normal face value of said instrument and is guaranteed by said certificate, substantially as described.

In testimony whereof, I affix my signature, in presence of two witnesses.

EMMOR KIMBER.

Witnesses:
R. F. FULLER,
S. C. PERCE.